US008924445B2

(12) United States Patent
Handa et al.

(10) Patent No.: US 8,924,445 B2
(45) Date of Patent: Dec. 30, 2014

(54) IMAGE DISPLAY DEVICE, METHOD, AND PROGRAM

(75) Inventors: Tetsuya Handa, Tokyo (JP); Kimiyasu Mizuno, Tokyo (JP); Takehiro Aibara, Tokyo (JP); Hitoshi Amagai, Tokyo (JP); Naotaka Uehara, Tokyo (JP); Takayuki Kogane, Tokyo (JP); Sumito Shinohara, Tokyo (JP); Masato Nunokawa, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 899 days.

(21) Appl. No.: 12/888,836

(22) Filed: Sep. 23, 2010

(65) Prior Publication Data

US 2011/0072040 A1    Mar. 24, 2011

(30) Foreign Application Priority Data

Sep. 24, 2009  (JP) ................................. 2009-219482

(51) Int. Cl.
*G06F 7/00*     (2006.01)
*G06F 17/00*    (2006.01)
*G06F 17/30*    (2006.01)

(52) U.S. Cl.
CPC .............................. *G06F 17/30265* (2013.01)
USPC ............................... 707/899; 348/25; 348/26

(58) Field of Classification Search
USPC ........... 707/714, 769; 348/148, 239; 701/487, 701/213; 439/152; 382/104, 133; 164/463
See application file for complete search history.

(56) References Cited

U.S. PATENT DOCUMENTS

| | | | | |
|---|---|---|---|---|
| 5,456,308 A | * | 10/1995 | Yukumoto et al. | 164/463 |
| 5,790,691 A | * | 8/1998 | Narayanswamy et al. | 382/133 |
| 6,366,856 B1 | | 4/2002 | Johnson | |
| 6,408,301 B1 | * | 6/2002 | Patton et al. | 707/741 |
| 6,978,295 B2 | | 12/2005 | Meifu et al. | |
| 7,386,394 B2 | * | 6/2008 | Shulman | 701/487 |
| 2001/0036293 A1 | * | 11/2001 | Laumeyer et al. | 382/104 |
| 2003/0222981 A1 | * | 12/2003 | Kisak et al. | 348/148 |
| 2005/0216193 A1 | * | 9/2005 | Dorfman et al. | 701/213 |
| 2007/0030363 A1 | * | 2/2007 | Cheatle et al. | 348/239 |
| 2007/0128899 A1 | * | 6/2007 | Mayer | 439/152 |
| 2009/0105945 A1 | | 4/2009 | Nonaka | |

FOREIGN PATENT DOCUMENTS

| | | |
|---|---|---|
| CN | 1474934 A | 2/2004 |
| CN | 1742274 A | 3/2006 |
| CN | 101414306 A | 4/2009 |
| JP | 2001-169164 A | 6/2001 |

(Continued)

OTHER PUBLICATIONS

Japanese Office Action dated Jul. 5, 2011 (and English translation thereof) in counterpart Japanese Application No. 2009-219482.

(Continued)

*Primary Examiner* — Susan Chen
(74) *Attorney, Agent, or Firm* — Holtz, Holtz, Goodman & Chick PC (57) ABSTRACT

It is an object of the present invention to search for image data with an intuitive operation to which active elements are added.
A digital photo frame 1 searches a non-volatile data base memory 15 or a network for image data based on parameters respectively related to a position and a direction in which the digital photo frame 1 is arranged, a distance or a depth from the digital photo frame 1, and time. The digital photo frame 1 displays an image expressed by the image data thus searched.

7 Claims, 6 Drawing Sheets

(56) References Cited

FOREIGN PATENT DOCUMENTS

| | | |
|---|---|---|
| JP | 2001-265780 A | 9/2001 |
| JP | 2002-229992 A | 8/2002 |
| JP | 2005-026859 A | 1/2005 |
| JP | 2006-279764 A | 10/2006 |
| JP | 2007-172197 A | 7/2007 |
| JP | 2009-100470 A | 5/2009 |

OTHER PUBLICATIONS

Chinese Office Action dated May 17, 2012 and English translation thereof in counterpart Chinese Application No. 201010535110X.
Chinese Office Action dated Jul. 12, 2013 (and English translation thereof) in counterpart Chinese Application No. 201010535110.X.

* cited by examiner

IMAGE DISPLAY DEVICE, METHOD, AND PROGRAM

The application is based on and claims the benefit of priority from Japanese Patent Application No. 2009-219482 filed on Sep. 24, 2009, the content of which is incorporated herein by reference.

BACKGROUND OF THE INVENTION

1. Field of the Invention

The present invention relates to an image display technique and particularly to an image display device, a method and a program that can display an image by searching with an intuitive operation to which active elements are added, for example.

2. Related Art

An image display device such as a personal computer, a digital photo frame and the like determines image data of an image to be displayed by searching an external memory card or built-in memory for the image data, or searching via a network such as wired or wireless LAN (Local Area Network) or the like for the image data. According to a conventional search method, when a viewer enters a keyword, the image display device searches for image data using the keyword and tag information written in meta data of the image data (see Japanese Patent Unexamined Patent Application Publication No. 2001-265780, for example).

SUMMARY OF THE INVENTION

However, with the conventional search method by way of a keyword, disclosed in Japanese Patent Unexamined Patent Application Publication No. 2001-265780 or the like, if the name of an image to be viewed is known, the image can be found in a pinpoint manner; however, if the viewer has only a vague impression on the image to be viewed, a cumbersome and time-consuming operation such as repeatedly inputting search keywords is needed.

As mentioned above, with the conventional search method, it is only possible to view the image searched based on the keyword in a passive manner. Therefore, it has not been possible for the viewer to search for an image with an intuitive operation including active elements and find an unpredictable and surprising image based on a vague impression other than entering a keyword. More specifically, the image that the viewer would like to view based on a vague impression is likely to be strongly related to an actual environment at which the viewer is present. However, with the conventional search method, every time a keyword is entered, image data relating to the keyword is repeatedly searched without any relationship with the actual environment where the viewer views an image, and it can be difficult to arrive at the image that is desired to be viewed.

Therefore, realization of a method that can search for image data with an intuitive operation to which active elements are added has been demanded; however, the current situation is that such a demand is not sufficiently accommodated.

The present invention was made in view of the above problems and it is an object of the present invention to provide an image display device, a method, and a program that can search for and display image data with an intuitive operation to which active elements are added.

According to a first aspect of the present invention, an image display device that searches for image data satisfying a predetermined search condition from among a plurality of image data associated with positional information, and causes an image expressed by the image data to be displayed on a display portion, the image display device including: a search portion that searches for the image data associated with the positional information satisfying the search conditions using a position and a direction in which the image display device is arranged as the search conditions; and a control portion that causes an image expressed by the image data searched by the search portion to be displayed on the display portion is provided.

According to a second aspect of the present invention, an image display device further including an arrangement positional information acquiring portion that acquires information on a position at which the image display device is arranged and an arrangement direction information acquiring portion that acquires information on a direction where the image display device is arranged, in which the search portion uses the position indicated by the information acquired by the arrangement positional information acquiring portion and the direction indicated by the information acquired by the arrangement direction information acquiring portion as the search conditions is provided.

According to a third aspect of the present invention, an image display device further including a distance information acquiring portion that acquires information on a distance or a depth using the image display device as a basis, in which the search portion searches for the image data associated with the positional information satisfying the search condition to which the distance or depth indicated by the information acquired by the distance information acquiring portion is added as the search condition is provided.

According to a fourth aspect of the present invention, an image display device is provided in which the distance information acquiring portion acquires the information on distance or depth based on an operation from a user.

According to a fifth aspect of the present invention, an image display device in which a time information acquiring portion that acquires information on time is further included, in which the plurality of image data is further associated with time information, and the search portion searches for the image data associated with the positional information and time information satisfying the search conditions to which the time indicated by the information acquired by the time information acquiring portion is further added as the search conditions is provided.

According to a sixth aspect of the present invention, an image display device is provided in which the time information acquiring portion acquires the current time at least as a part of the time information.

According to a seventh aspect of the present invention, an image display device is provided in which the time information acquiring portion acquires at least a part of the time information based on an operation from a user.

According to an eighth aspect of the present invention, an image display device is provided further including a storage portion that stores the plurality of image data, in which the search portion searches for the image data from the storage portion.

According to a ninth aspect of the present invention, an image display device is provided further including a communication portion that is capable of communication with an external device, in which the search portion searches for the image data from the external device with which the communication portion communicates.

According to a tenth aspect of the present invention, an image display method for searching for image data satisfying a predetermined search condition from among a plurality of image data associated with positional information, and causing an image expressed by the image data to be displayed on an image display device, the image display method including: a search step of searching for image data associated with the positional information satisfying search conditions using a position and a direction in which the image display device is arranged as the search conditions and a control step of causing an image expressed by the image data thus searched in the search step to be displayed on the image display device.

According to an eleventh aspect of the present invention, a program is provided for causing a computer controlling an image display device, which searches for image data satisfying a predetermined search condition from among a plurality of image data associated with positional information and displays an image expressed by the image data, to implement: a search function for searching for the image data associated with the positional information satisfying search conditions using a position and a direction in which the image display device is arranged as the search conditions and a control function for causing the image display device to display the image expressed by the image data thus searched by the search function.

According to the present invention, it is possible to search for and display image data with an intuitive operation to which active elements are added.

DETAILED DESCRIPTION OF THE INVENTION

An embodiment of the present invention will be described below based on the attached drawings.

Figure 1:
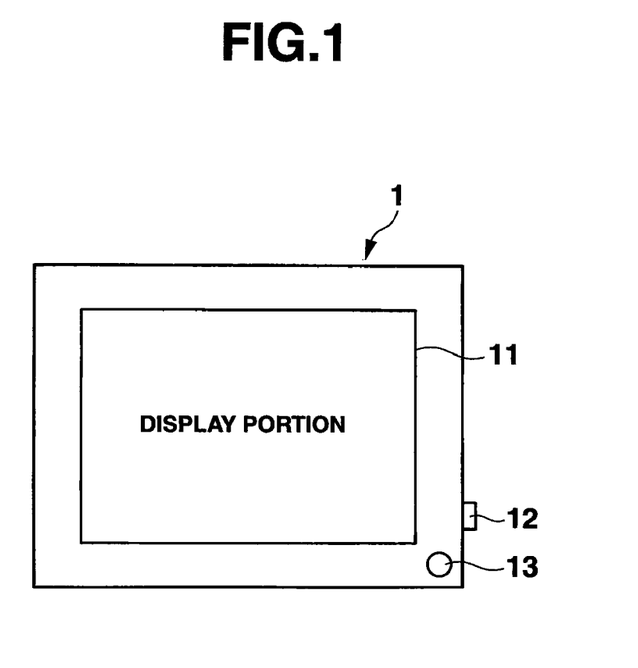
FIG. 1 is a front view showing an exterior configuration of a digital photo frame constituting an embodiment of an image display device according to the present invention.

An image display device according to the present invention can be configured by a digital photo frame, a personal computer, or the like. A case in which the image display device is configured as a digital photo frame will be described hereinafter. FIG. 1 is a front view showing an example of an exterior configuration of the digital photo frame.

On a front face of the digital photo frame 1, a display portion 11 configured as a liquid crystal display or the like, for example, and a time knob 13 for adjusting a time parameter are provided. On a side face of the digital photo frame 1, a distance direction knob 12 for adjusting a parameter of a distance or a depth is provided. It should be noted that these parameters will be described later referring to the drawings, starting from FIG. 2.

Figure 2:
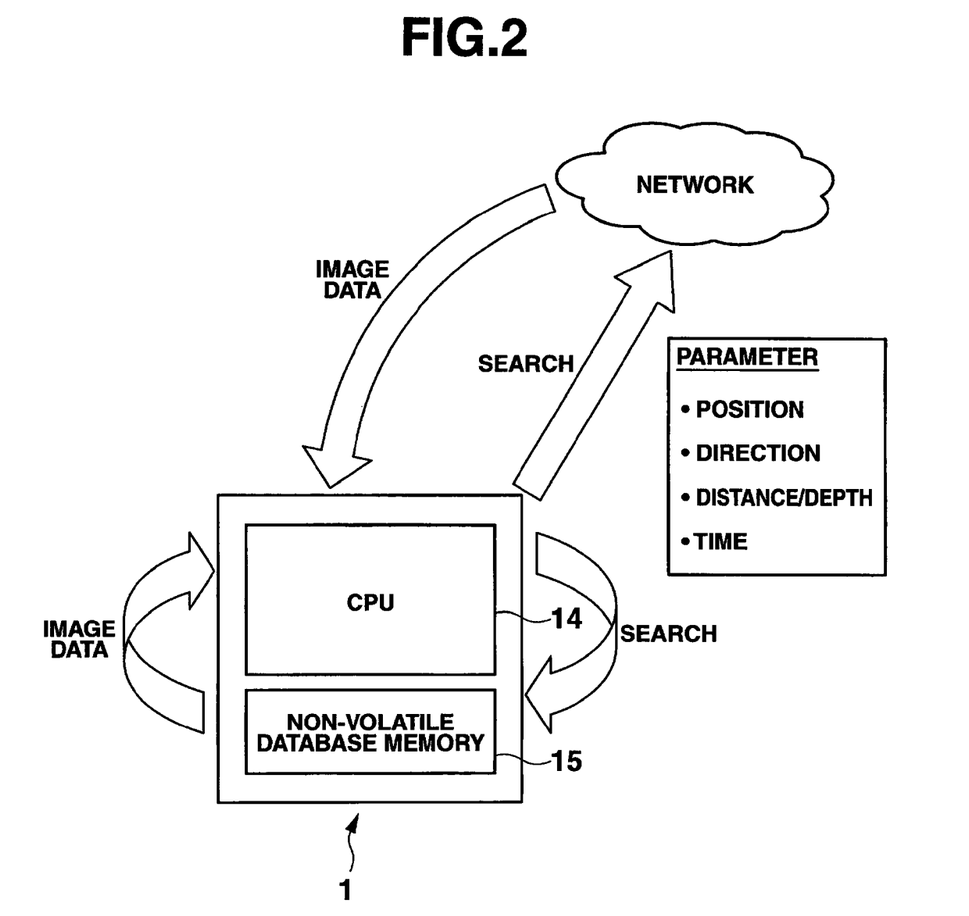
FIG. 2 is a diagram illustrating an outline of search processing of image data by the digital photo frame shown in FIG. 1.

FIG. 2 is a schematic diagram illustrating an outline of search processing of image data by the digital photo frame 1.

As shown in FIG. 2, the digital photo frame 1 includes a CPU (Central Processing Unit) 14 and non-volatile database memory 15.

The CPU 14 executes various types of processing according to a program stored in ROM (Read Only Memory), not illustrated. Alternatively, the CPU 14 may execute various types of processing according to a program loaded from the non-volatile database memory 15 to RAM (Random Access Memory), not illustrated. The RAM also stores data or the like required upon execution of the various types of processing by the CPU 14 as appropriate.

In the present embodiment, for example, the CPU 14 searches for image data and causes an image to be displayed on the display portion 11 based on the image data thus searched. Hereinafter, the above series of processing will be referred to as image display processing. In the present embodiment, the program for realizing such an image display processing is stored in the ROM or the non-volatile database memory 15. Therefore, the CPU 14 executes the image display processing according to this program.

The non-volatile database memory 15 stores various data in addition to the above-mentioned program. For example, the non-volatile database memory 15 stores image data to be searched by the CPU 14.

Moreover, in the present embodiment, the image data to be searched by the CPU 14 is stored not only in the non-volatile database memory 15 built into the digital photo frame 1, but also in a device on a predetermined network such as the Internet. That is, in the present embodiment, the CPU 14 can search the non-volatile database memory 15 and the network, respectively, for the image data of an image to be displayed.

As a search method of image data, the above-mentioned conventional method, i.e. a method of searching for image data based on a keyword typed by a viewer, can naturally be employed. Moreover, in the present embodiment, a search method is employed in which a position and a direction in which the digital photo frame 1 is arranged and a distance (or a depth) based on the digital photo frame 1 and time are employed as parameters, respectively, and image data is searched based on these four parameters. Hereinafter, the above search method will be referred to as a "parameter search method".

Figure 3:
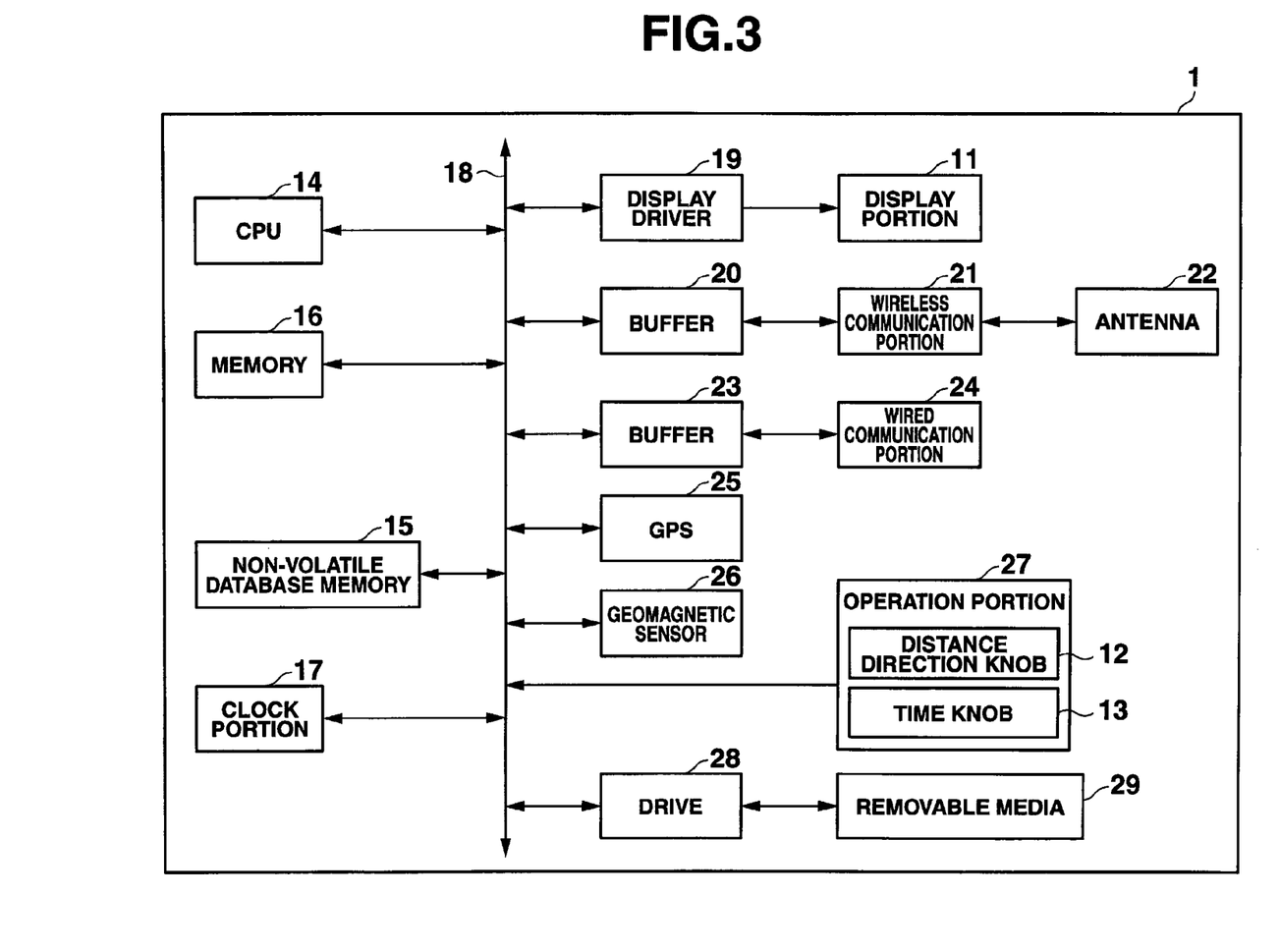
FIG. 3 is a block diagram showing a configuration of hardware of the digital photo frame shown in FIG. 1.

FIG. 3 is a block diagram showing a configuration of hardware of the digital photo frame 1 to which the parameter search method is applied.

Specifically, the digital photo frame 1 further includes, in addition to the above-mentioned display portion 11 to the non-volatile database memory 15, memory 16 including the above-mentioned ROM and RAM, a clock portion 17, a bus 18, a display driver 19, a buffer 20, a wireless communication portion 21, an antenna 22, a buffer 23, a wired communication portion 24, a GPS (Global Positioning System) 25, a geomagnetic sensor 26, an operation portion 27, and a drive 28.

The clock portion 17 keeps the current time. In the present embodiment, the current time kept by the clock portion 17 is used as a reference value for calculating a time parameter. As will be described later, it should be noted that it is naturally possible to use the current time as a time parameter in an unaltered state.

The CPU 14, the non-volatile database memory 15, the memory 16, and the clock portion 17 are mutually connected through the bus 18. The display driver 19, the buffer 20, the buffer 23, the GPS 25, the geomagnetic sensor 26, the operation portion 27, and the drive 28 are also connected to this bus 18.

The display driver 19 acquires predetermined image data from the non-volatile database memory 15 or other devices on the network (not illustrated), and displays an image expressed by the image data on the display portion 11 as a display image.

The buffer 20 temporarily stores various data wirelessly communicated by the wireless communication portion 21. The wireless communication portion 21 controls wireless communication performed between other devices through the network including the Internet. This wireless communication is performed through the antenna 22. The buffer 23 temporarily stores various data that is communicated via wire by the wired communication portion 24. The wired communication portion 24 controls wired communication performed between the other devices through the network including the Internet. As mentioned above, the digital photo frame 1 is capable of both wireless communication and wired communication with the other devices through the network.

The GPS 25 measures a current position of the digital photo frame 1 by calculating a distance from a plurality of GPS satellites. In the present embodiment, the CPU 14 acquires a measurement result of the GPS 25 as a parameter of a position where the digital photo frame 1 is arranged. That is, a pair of the CPU 14 and the GPS 25 is an example of an arrangement positional information acquiring portion.

The geomagnetic sensor 26 detects geomagnetism and measures a direction in which the digital photo frame 1 is arranged based on a detection result. In the present embodiment, the CPU 14 acquires a measurement result of the geomagnetic sensor 26 as a parameter of a direction in which the digital photo frame 1 is arranged. That is, a pair of the CPU 14 and the geomagnetic sensor 26 is an example of an arrangement direction information acquiring portion.

The operation portion 27 receives an operation to the digital photo frame 1 and notifies the operation contents to the CPU 14. The operation portion 27 includes a distance direction knob 12 and a time knob 13, which are shown in FIG. 1.

Setting of the distance direction knob 12 is adjusted according to an operation amount. In the present embodiment, the CPU 14 acquires a set value of the distance direction knob 12 as a parameter of a distance or a depth, with the digital photo frame 1 as a basis. That is, a pair of the distance direction knob 12 and the CPU 14 is an example of the distance information acquiring portion.

Setting of the time knob 13 is adjusted according to an operation amount. In the present embodiment, the CPU 14 acquires, as a parameter of time, a value equal to a set value of the time knob 13 subtracted or added to a reference value, which is the current time kept by the clock portion 17. That is, a group of the time knob 13, the CPU 14, and the clock portion 17 is an example of the time information acquiring portion.

Removable media 29 composed of a magnetic disk, an optical disk, a magnetic optical disk, a semiconductor memory, or the like is mounted to the drive 28 as appropriate. Then, a program read out therefrom is installed in the non-volatile database memory 15 as necessary.

Figure 4:
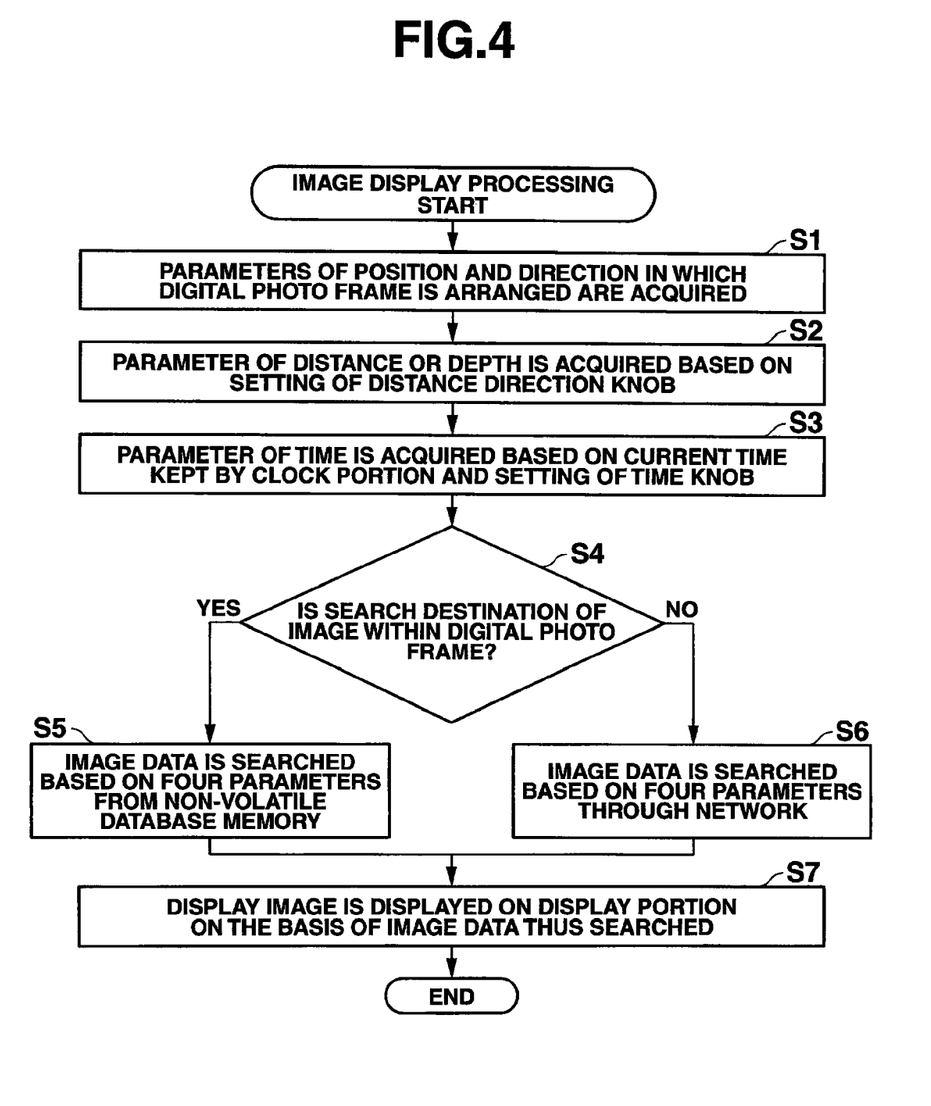
FIG. 4 is a flowchart showing an example of a flow of image display processing by the digital photo frame shown in FIG. 1.

FIG. 4 is a flowchart showing an example of a flow of the image display processing by the digital photo frame 1.

In Step S1, the CPU 14 controls the GPS 25 and the geomagnetic sensor 26, and acquires a parameter of a position and a direction in which the digital photo frame 1 is arranged.

In Step S2, the CPU 14 acquires a parameter of a distance or a depth based on the setting of the distance direction knob 12.

In Step S3, the CPU 14 acquires a parameter of time based on the current time kept by the clock portion 17 and the setting of the time knob 13.

In Step S4, the CPU 14 determines whether a search destination of image data is within the digital photo frame 1 or not.

In a case of the search destination of the image data being within the digital photo frame 1, it is determined to be YES in Step S4, and the processing proceeds to Step S5. In Step S5, based on the four parameters acquired in the processing from Step S1 to Step S3, the CPU 14 searches the non-volatile database memory 15 for the image data.

Specifically, in the present embodiment, the image data to be searched is associated with the positional information and the time information. Herein, the information associated with the image data includes information such as so-called meta data, which is not contained in the image data at the time of generation, but is later associated with the image data. Moreover, the information associated with the image data includes information, which is potentially contained in the image data, and is later extracted from the image data by appropriate image processing or image analysis at arbitrary timing including the time during execution of the image display processing, and then associated with the image data. The CPU 14 searches the non-volatile database memory 15 for the image data associated with the positional information and time information satisfying the search conditions, which are four parameters acquired in the processing from Step S1 to Step S3. It should be noted that the method of searching for the image data in Step S5 is not particularly limited to the method of the present embodiment thus described, and an arbitrary method can be applied as long as the four parameters acquired in the processing from Step S1 to Step S3 are utilized.

In a case in which the search destination of the image data is outside the digital photo frame 1, it is determined to be NO in Step S4, and the processing proceeds to Step S6. In Step S6, the CPU 14 searches through the network for the image data based on the four parameters acquired from the processing from Step S1 to Step S3. That is, the CPU 14 controls the wireless communication portion 21 or the wired communication portion 24 and transmits and receives various types of information including the four parameters with the other devices on the network so as to search the other devices for the image data and receives the image data thus searched through the network.

It should be noted that, in the present embodiment, the method of searching for the image data in Step S6 is a method similar to the above-mentioned method of searching for the image data in Step S5.

However, the method of searching for the image data in Step S6 is not limited to the method of the present embodiment, and an arbitrary method can be applied as long as the four parameters acquired in the processing from Step S1 to Step S3 are utilized. In other words, the method of searching for the image data in Step S6 is not necessarily the same as the method of searching for the image data in Step S5.

If the image data is found in the processing in Step S5 or Step S6, the processing proceeds to Step S7. In Step S7, the CPU 14 controls the display driver 19, and causes the display image to be displayed on the display portion 11 on the basis of the image data thus found.

As a result, the image display processing is terminated.

Hereinafter, the image display processing will be explained in detail while referring to FIGS. 5 and 6.

Figure 5:
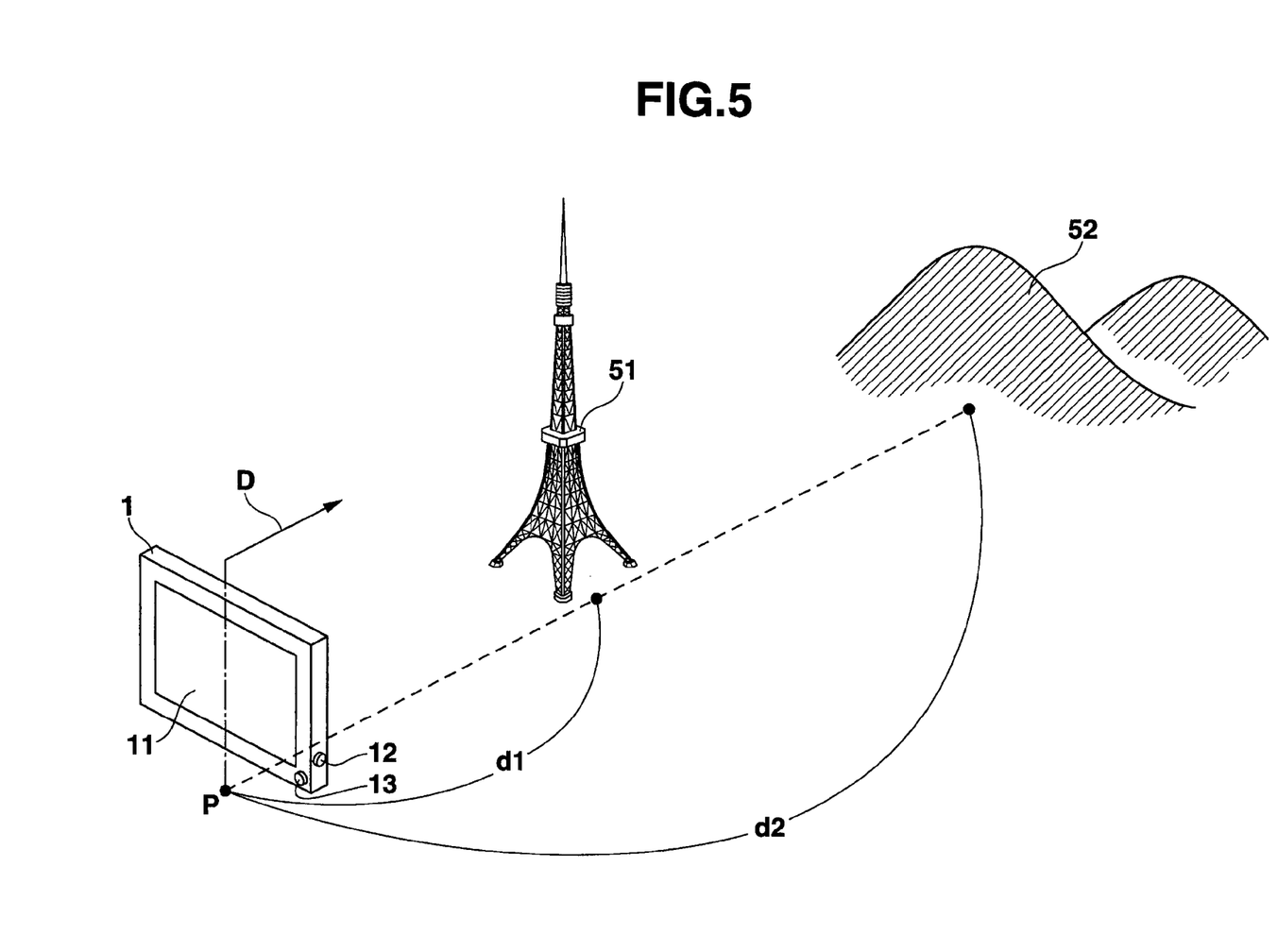
FIG. 5 is a diagram showing a specific example of an arrangement relationship of the digital photo frame shown in FIG. 1.

FIG. 5 is a diagram showing an example of an arrangement relationship of the digital photo frame 1.

In the example of FIG. 5, the digital photo frame 1 is arranged so that its back face (the face opposite to the display face of the display portion 11) is facing toward a direction D at a position P in the real world. Then, in the real world, a tower 51 is present at a position separated only by a distance d1 from the position P in the direction D, and a mountain 52 is present at a position separated only by a distance d2.

If the image display processing in FIG. 4 is started while the positional relationship in FIG. 5 is maintained, information indicative of the position P as a positional parameter and information indicative of the direction D as a directional parameter are acquired in the processing in Step S1.

It is herein assumed that the setting of the distance direction knob 12 is a setting corresponding to the distance d1, a time zone of the current time is noon, and the setting of the time knob 13 is a 0 setting (default setting), for example. In this case, in the processing in Step S2, information indicative of the distance d1 is acquired as a parameter of distance or depth. In the processing in Step S3, information indicative of the time zone (the time zone of the current time) of noon is acquired as a time parameter. As a result, by means of the processing from Step S4 to Step S7, the non-volatile database memory 15 or the other devices on the network are searched for the image data on the tower 51 in the time zone (the time zone of the current time) of noon, and the image shown in FIG. 6A is displayed on the display portion 11 based on this image data.

Figure 6A:
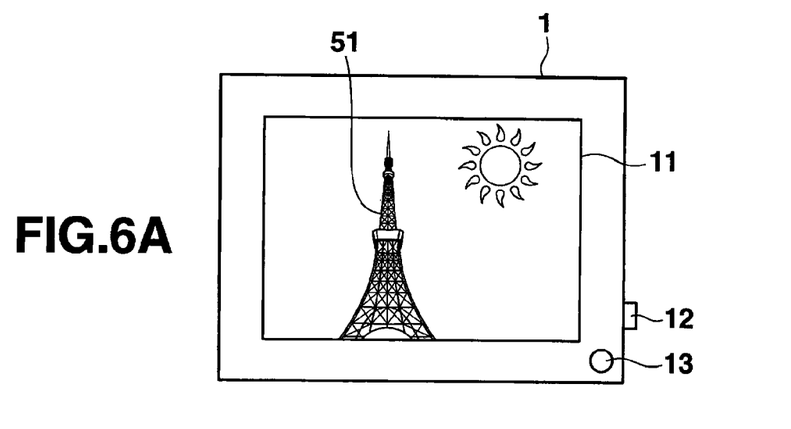
FIG. 6 is a set of diagrams respectively showing specific examples of results of the image display processing by the digital photo frame shown in FIG. 1.

More specifically, it is assumed that the positional information indicative of the existing position of the tower 51 and the time information indicative of the time zone of noon are associated with the image shown in FIG. 6A, for example. In this case, the position, which is from the position P indicated by the positional parameter separated by the distance d1 indicated by the distance or depth parameter toward the direction D indicated by the directional parameter, matches the position (existing position of the tower 51) indicated by the positional information associated with the image shown in FIG. 6A. In addition, the time zone of noon indicated by the time parameter (the time zone of the current time) matches the noon time zone indicated by the time information associated with the image shown in FIG. 6A. Therefore, the image data of the image shown in FIG. 6A is found.

Subsequently, it is assumed that the distance direction knob 12 is operated and the setting corresponding to the distance d1 is changed to the setting corresponding to the distance d2. However, it is also assumed that the time knob 13 is not operated, and is kept at the 0 setting (the default setting). In this case, in the processing in Step S2, information indicative of the distance d2 is acquired as a distance or depth parameter. In the processing in Step S3, information indicative of the time zone (the time zone of the current time) of noon is acquired as a time parameter. As a result, through the processing from Step S4 to Step S7, the non-volatile database memory 15 or from the other devices on the network are searched for the image data on the mountain 52 in the time zone (the time zone of the current time) of noon, and the image shown in FIG. 6B is displayed on the display portion 11 on the basis of the image data.

Figure 6B:
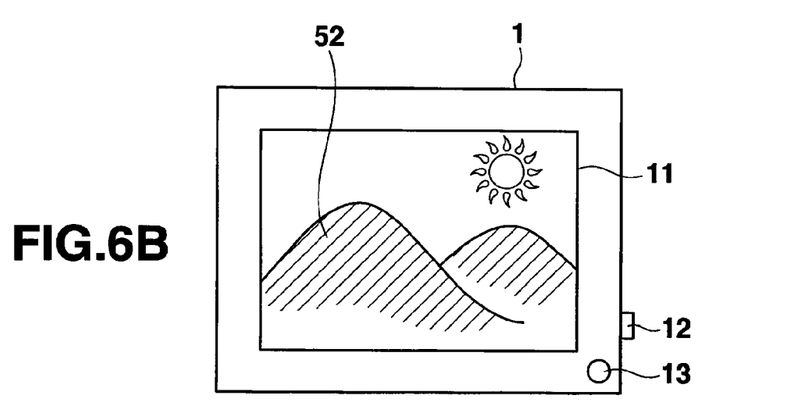

More specifically, it is assumed that the positional information indicative of the existing position of the mountain 52 and the time information indicative of the time zone of noon are associated with the image shown in FIG. 6B, for example. In this case, the position, which is from the position P indicated by the positional parameter separated only by the distance d2 indicated by the distance or depth parameter toward the direction D indicated by the directional parameter, matches the position (existing position of the mountain 52) indicated by the positional information associated with the image shown in FIG. 6B. In addition, the time zone of noon indicated by the time parameter (the time zone of the current time) matches the time zone of noon indicated by the time information associated with the image shown in FIG. 6B. Therefore, the image data of the image shown in FIG. 6B is found.

Moreover, it is assumed that the time knob 13 is operated and the 0 setting is changed to a setting corresponding to 12 hours later. However, it is also assumed that the distance direction knob 12 is not operated, and is kept at the setting corresponding to the distance d2. In this case, in the processing in Step S2, information indicative of the distance d2 is acquired as a distance or depth parameter. In the processing in Step S3, information indicative of the time zone of 12 hours after the current time, i.e. information indicative of a time zone of night is acquired as a time parameter. As a result, through the processing from Step S4 to Step S7, the non-volatile database memory 15 or the network is searched for the image data on the mountain 52 in the time zone (the time zone of 12 hours after the current time) of night, and the image shown in FIG. 6C is displayed on the display portion 11 on the basis of the image data.

Figure 6C:
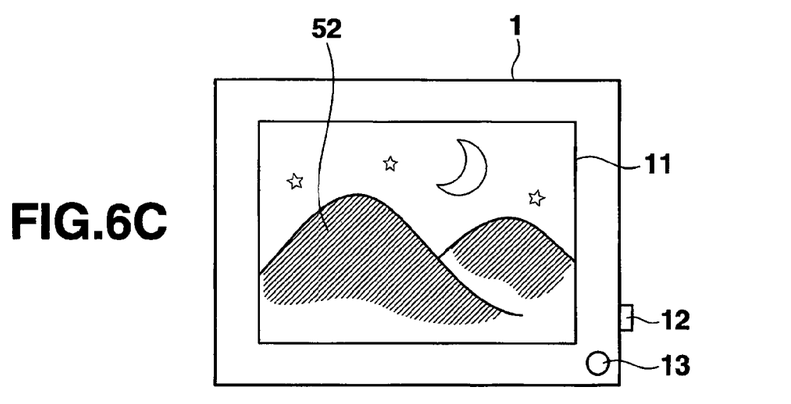

More specifically, it is assumed that the positional information indicative of the existing position of the mountain 52 and the time information indicative of the time zone of night are associated with the image shown in FIG. 6C, for example. In this case, the position, which is from the position P indicated by the positional parameter separated by the distance d2 indicated by the distance or depth parameter toward the direction D indicated by the directional parameter, matches the position (existing position of the mountain 52) indicated by the positional information associated with the image shown in FIG. 6C. In addition, the time zone of night indicated by the time parameter (the time zone of 12 hours after the current time) matches the time zone of night indicated by the time information associated with the image shown in FIG. 6C. Therefore, the image data of the image shown in FIG. 6C is found.

As described above, in the present embodiment, the position and the direction in which the digital photo frame 1 is arranged, the distance (or depth) based on the digital photo frame 1, and the time are employed as parameters for searching for the image data. Then, the digital photo frame 1 searches for the image data based on the four parameters. As a result, as compared with the conventional search method using a keyword, an image suitable for the actual environment where the digital photo frame 1 is located, i.e. the actual environment where the viewer is present, can be searched. This effect can also be exerted utilizing only the parameters of the position and direction in which the digital photo frame 1 is arranged. Moreover, this effect is made more remarkable by further utilizing the parameter of distance or depth based on the digital photo frame 1 and the time parameter.

Moreover, the viewer can adjust the parameter of distance or depth and the parameter of time just by performing an intuitive and simple operation using the distance direction knob 12 and the time knob 13. As a result, for viewers, it becomes possible to realize a new way of searching for an image in combination with an idea of "what is there in this direction away from here?" or "how does it change with time?", and thus, a surprising image or an unpredictable image can be easily searched. In other words, the viewer can easily perform operations considering the actual environment, and as compared with the conventional act such as a slide show in which limited images are passively viewed, a viewing act with active elements added can be realized. As a result, the viewer can easily view not only intended images, but also surprising images and unpredictable images.

The present invention is not limited to the present embodiment, and includes variations and improvements thereto within a range that can achieve the object of the present invention.

For example, in the present embodiment, four types of parameters such as the position and direction in which the digital photo frame 1 is arranged, the distance (or the depth) based on the digital photo frame 1, and time are employed. However, it is only necessary for the position and the direction to be employed as the types of the parameter. That is, only these two types of the parameters may be employed; however, by adding one type among parameters of the distance (or the depth) and the time to these two types, three types of the parameters may also be employed. Moreover, the other types of parameters such as parameters based on an operation history or preference information of the viewer may be added.

For example, in the present embodiment, using the current time as a reference value, as a method of calculating the time parameter, a method of adding or subtracting the set value of the time knob 13 to or from the reference value is employed. However, the method of calculating the time parameter is not particularly limited to the method of the present embodiment. For example, it is not particularly necessary to use the current time as the reference value, and an arbitrary time such as a default fixed time may be used as the reference value to calculate the time parameter.

In the present embodiment, the search destination of the image data is the non-volatile database memory 15 or the network, for example. However, the search destination of the image data is not particularly limited to the search destination of the present embodiment. For example, the removable media 29 in FIG. 3 or other devices (not illustrated) that are directly connected not via the network and the like may be used as the search destination of the image data.

Incidentally, the series of processing according to the present invention can be executed by hardware and also can be executed by software.

In a case in which the series of processing is to be executed by software, the program configuring the software is installed from a network or a storage medium in a computer or the like. The computer may be a computer incorporated in exclusive hardware. Alternatively, the computer may be a computer capable of executing various functions by installing various programs, i.e. a general-purpose personal computer, for example.

Although not illustrated, the storage medium containing the program can be constituted not only by a removable media distributed separately from the device main body for supplying the program to a user, but also by a storage medium or the like supplied to the user in a state incorporated in the device main body in advance. The removable media is composed of a magnetic disk (including a floppy disk), an optical disk, a magnetic optical disk, or the like, for example. The optical disk is composed of a CD-ROM (Compact Disk-Read Only Memory), a DVD (Digital Versatile Disk), and the like. The magnetic optical disk is composed of an MD (Mini-Disk) or the like. The storage medium supplied to the user in the state incorporated in the device main body in advance includes the ROM included in the memory 16 in FIG. 3 storing the program, the non-volatile database memory 15 in FIG. 3, a hard disk, not illustrated, and the like, for example.

It should be noted that, in the present description, the step describing the program stored in the storage medium includes not only the processing executed in a time series following this order, but also the processing executed in parallel or individually, which is not necessarily executed in a time series.

What is claimed is:

1. An image display device comprising:
a front face;
a back face which faces in a direction opposite to a direction in which the front face faces;
a display portion configured to display an image expressed by image data wherein a display face of the display portion is provided on the front face of the image display device, and faces in the same direction as the front face of the image display device;
a CPU;
a position sensor which is configured to function in cooperation with the CPU to be operable as a positional information acquiring unit which acquires positional information indicating a current position where the image display device is arranged;
a direction sensor which is arranged in the image display device and is configured to function in cooperation with the CPU to be operable as a direction information acquiring unit which acquires a current direction in which the back face of the image display device is facing;
an input device for inputting image data;
wherein the CPU is configured to be operable as a search unit which is operable to search for image data input via the input device which is associated with positional information satisfying search conditions from among a plurality of pieces of image data, wherein the search unit uses, as a search condition, positional information of a location existing in the current direction acquired by the direction information acquiring unit from the current position of the image display device indicated by the positional information acquired by the positional information acquiring unit; and
wherein the CPU is configured to cause an image expressed by the image data found by the search unit to be displayed on the display portion.

2. An image display device as set forth in claim 1, further comprising a storage unit configured to store the plurality of pieces image data input via the input device,
wherein the search unit searches for the image data from the storage unit.

3. An image display device as set forth in claim 1, wherein the input device comprises a communication unit configured to communicate with an external device,
wherein the search unit searches the external device with which the communication unit communicates for the image data.

4. The image display device according to claim 1,
wherein the CPU is further configured to be operable as a separated position setting unit that sets a position that is separated from the current position where the image display device is arranged by a predetermined distance in the current direction acquired by the direction information acquiring unit,
wherein the search unit uses positional information indicating the position set by the separated position setting unit as a search condition, and searches for image data input via the input device which is associated with positional information satisfying the search condition.

5. The image display device according to claim 1, further comprising:
a current time acquiring unit which acquires a current time;
wherein the CPU is further configured to be operable as a time setting unit which sets a time after a predetermined elapsed amount of time from the current time acquired by the current time acquiring unit;

wherein the search unit further uses the time set by the time setting unit as a search condition, and searches for image data associated with positional information and time information satisfying the search conditions.

6. An image display method for an image display device which includes (i) a front face, (ii) a back face which faces in a direction opposite to a direction in which the front face faces, (iii) a display portion configured to display an image expressed by image data, wherein a display face of the display portion is provided on the front face of the image display device, and faces in the same direction as the front face of the image display device, (iv) a CPU, (v) a position sensor which is configured to function in cooperation with the CPU to be operable as a positional information acquiring unit, (vi) a direction sensor which is arranged in the image display device and is configured to function in cooperation with the CPU to be operable as a direction information acquiring unit, and (vii) an input device for inputting image data, the image display method comprising:

acquiring, with the positional information acquiring unit, positional information indicating a current position where the image display device is arranged;

acquiring, with the direction information acquiring unit, a current direction in which the back face of the image display device is facing;

searching, with the CPU, for image data input via the input device which is associated with positional information satisfying search conditions from among a plurality of pieces of image data, wherein, as a search condition, positional information of a location existing in the acquired current direction from the current position of the image display device indicated by the acquired positional information is used; and     causing, with the CPU, the display portion to display an image expressed by the image data found by the searching.

7. A non-transitory computer-readable storage medium having stored thereon a program that is executable by a computer for controlling an image display device which includes (i) a front face, (ii) a back face which faces in a direction opposite to a direction in which the front face faces, (iii) a display portion configured to display an image expressed by image data, wherein a display face of the display portion is provided on the front face of the image display device, and faces in the same direction as the front face of the image display device, (iv) a position sensor which is configured to function in cooperation with the computer to be operable as a positional information acquiring unit, (v) a direction sensor which is arranged in the image display device and is configured to function in cooperation with the computer to be operable as a direction information acquiring unit, and (vi) an input device for inputting image data, the program being executable by the computer to perform functions comprising:

acquiring, with the positional information acquiring unit, positional information indicating a current position where the image display device is arranged;

acquiring, with the direction information acquiring unit, a current direction in which the back face of the image display device is facing;

searching for image data input via the input device which is associated with positional information satisfying search conditions from among a plurality of pieces of image data, wherein, as a search condition, positional information of a location existing in the acquired current direction from the current position of the image display device indicated by the acquired positional information is used; and     causing the display portion to display an image expressed by the image data found by the searching.

\* \* \* \* \*